United States Patent
Yan et al.

(10) Patent No.: US 11,110,448 B1
(45) Date of Patent: Sep. 7, 2021

(54) METHOD FOR PREPARING GOLD NANORODS HAVING HIGH CATALYTIC ACTIVITY BY USING FEMTOSECOND LASER

(71) Applicant: Tsinghua University, Beijing (CN)

(72) Inventors: Jianfeng Yan, Beijing (CN); Dezhi Zhu, Beijing (CN); Yue Zhao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/318,036

(22) Filed: May 12, 2021

Related U.S. Application Data

(63) Continuation of application No. PCT/CN2020/110434, filed on Aug. 21, 2020.

(30) Foreign Application Priority Data

Sep. 18, 2019 (CN) .......................... 201910881199.6

(51) Int. Cl.
*B01J 37/34* (2006.01)
*B01J 35/00* (2006.01)
(Continued)

(52) U.S. Cl.
CPC ............. *B01J 37/349* (2013.01); *B01J 23/52* (2013.01); *B01J 35/0046* (2013.01);
(Continued)

(58) Field of Classification Search
CPC ...... B01J 37/349; B01J 23/52; B01J 35/0046; B01J 37/009; B22F 9/24; B22F 2301/255; B23K 26/0643; B82Y 30/00; B82Y 40/00
(Continued)

(56) References Cited

U.S. PATENT DOCUMENTS 8,309,389 B1  11/2012  Alie et al.
9,373,515 B2 *  6/2016  Markovich ......... C23C 18/1651
(Continued)

FOREIGN PATENT DOCUMENTS

CN      101343778         1/2009
CN    10 2921961    *  2/2013   ............... B22F 9/24
(Continued)

OTHER PUBLICATIONS

Yasemin Gundogdu et al., "Femtosecond Laser Ablation Synthesis of Nanoparticles and Nano-Hybrides in Ethanol Medium." Materials Today: Proceedings 18, pp. 1803-1810. (Year: 2019).*
(Continued)

*Primary Examiner* — Patricia L. Hailey
(74) *Attorney, Agent, or Firm* — Hodgson Russ LLP

(57) ABSTRACT

Provided is a method for preparing gold nanorods having a high catalytic activity by using a femtosecond laser. The method includes: (1) preparing a gold seed solution; (2) preparing a gold nanorod solution by a seed solution growth process; (3) subjecting the gold nanorod solution to a centrifugal separation to obtain the gold nanorods, and dropping the gold nanorods on a silicon substrate; (4) building a system for preparing the gold nanorods having the high catalytic activity by using the femtosecond laser; and (5) emitting a pulse of the femtosecond laser on the silicon substrate, to allow an electric field distribution of a surface of the gold nanorod on the silicon substrate to change, to partially exfoliate atoms on the surface of the gold nanorod, thereby obtaining the gold nanorod with the high catalytic activity.

15 Claims, 1 Drawing Sheet

(51) Int. Cl.
- B22F 9/24 (2006.01)
- B23K 26/06 (2014.01)
- B01J 37/00 (2006.01)
- B01J 23/52 (2006.01)
- B82Y 30/00 (2011.01)
- B82Y 40/00 (2011.01)

(52) U.S. Cl.
CPC .............. B01J 37/009 (2013.01); B22F 9/24 (2013.01); B23K 26/0643 (2013.01); B22F 2301/255 (2013.01); B82Y 30/00 (2013.01); B82Y 40/00 (2013.01)

(58) Field of Classification Search
USPC ........... 502/5, 344; 210/787, 512.1; 977/810
See application file for complete search history.

(56) References Cited

U.S. PATENT DOCUMENTS

| | | | | |
|---|---|---|---|---|
| 9,574,272 | B2* | 2/2017 | Markovich | H05K 1/0274 |
| 10,332,657 | B2* | 6/2019 | Chen | B22F 9/24 |
| 2010/0055448 | A1* | 3/2010 | Tomura | G11B 7/245 |
| | | | | 428/328 |
| 2015/0093550 | A1 | 4/2015 | Hofmeister et al. | |
| 2016/0018335 | A1* | 1/2016 | Xiong | B05D 3/066 |
| | | | | 428/206 |

FOREIGN PATENT DOCUMENTS

| | | | | |
|---|---|---|---|---|
| CN | 102962469 | | 3/2013 | |
| CN | 103658993 | | 3/2014 | |
| CN | 104028777 | | 9/2014 | |
| CN | 104907578 | | 9/2015 | |
| CN | 105842181 | | 8/2016 | |
| CN | 106216833 | | 12/2016 | |
| CN | 106905966 | | 6/2017 | |
| CN | 108213718 | | 6/2018 | |
| CN | 108568594 | | 9/2018 | |
| CN | 108788472 | | 11/2018 | |
| CN | 109576640 | | 4/2019 | |
| CN | 109868462 | | 6/2019 | |
| CN | 11 0280776 | * | 9/2019 | B22F 1/00 |
| CN | 110560703 | | 12/2019 | |
| JP | 2005 068447 | * | 3/2005 | C25C 5/02 |
| JP | 2007237221 | | 9/2007 | |

OTHER PUBLICATIONS

Jorge Perez-Juste et al., "Gold nanorods: Synthesis, characterization and applications." Coordination Chemistry Reviews 249, pp. 1870-1901. (Year: 2005).*

Nikhil R. Jana et al., "Wet Chemical Synthesis of High Aspect Ration Cylindrical Gold Nanorods." J. Phys. Chem. B, 105, pp. 4065-4067. (Year: 2001).*

Fabien Hubert et al., "Cetyltrimethylammonium Bromide Silver Bromide Complex as the Capping Agent of Gold Nanorods." Langmuir, 24, pp. 9219-9222. (Year: 2008).*

Yang Yu et al., "Femtosecond laser assisted synthesis of gold nanorod and graphene hybrids and its photothermal property in the near-infrared region." Journal of Physics and Chemistry of Solids 132, pp. 116-120. (Year: 2019).*

Dezhi Tan et al., "Preparation of functional nanomaterials with femtosecond laser ablation in solution." Journal of Photochemistry and Photobiology C: Photochemistry Reviews 17, pp. 50-68. (Year: 2013).*

Yasutaka Nakajima et al., "Fabrication of isolated platinum nanowire gratings and nanoparticles on silica substrate by femtosecond laser irradiation." Applied Surface Science 394, pp. 108-114. (Year: 2017).*

Weina Han et al., "Controllable Plasmonic Nanostructures induced by Dual-wavelength Femtosecond Laser Irradiation." Scientific Reports 7, 17333, pp. 1-20. (Year: 2017).*

Chen, "Femtosecond Laser Induced Microstructures in Materials and Potential Application on Optical Storage," Dissertation Submitted for the Degree of Master, South China University of Technology, Apr. 2018, 79 pages.

SIPO, First Office Action for CN Application No. 201910881199.6, dated Apr. 10, 2020.

SIPO, Notification to Grant Patent Right for Invention for CN Application No. 201910881199.6, dated Jul. 27, 2020.

WIPO, International Search Report and Written Opinion for PCT/CN2020/110434, dated Nov. 11, 2020.

* cited by examiner

METHOD FOR PREPARING GOLD NANORODS HAVING HIGH CATALYTIC ACTIVITY BY USING FEMTOSECOND LASER

CROSS-REFERENCE TO RELATED APPLICATION

This application is a continuation of International Application No. PCT/CN2020/110434, filed with the National Intellectual Property Administration of P. R. China on Aug. 21, 2020, which claims priority to and benefits of Chinese Patent Application Serial No. 201910881199.6, filed with the National Intellectual Property Administration of P. R. China on Sep. 18, 2019, the entire contents of which are incorporated by reference herein.

FIELD

The present disclosure relates to the field of gold nanorod (AuNR) preparation, and more particularly to a method for preparing gold nanorods having a high catalytic activity by using a femtosecond laser.

BACKGROUND

In catalytic application, it is known that crystal surface structure of a gold nanorod will affect its catalytic performance. In order to control the crystal surface structure of the gold nanorod, the surface of the gold nanorod is usually modified by chemical etching methods to form a high-index crystal face. However, these existing methods have complex procedures and conditions, and exhibit low controllability for modifying the surface of the gold nanorod.

Therefore, there is an urgent need for providing a method which is capable of efficiently and simply preparing gold nanorods with a high-index crystal plane and thus a high catalytic activity.

SUMMARY

Embodiments of the present disclosure seek to solve at least one of the problems existing in the related art to at least some extent.

In an aspect, the present disclosure provides in embodiments a method for preparing gold nanorods having a high catalytic activity by using a femtosecond laser. The method includes: (1) preparing a gold seed solution, including: adding a tetrachloroauric acid solution with a molar concentration of 0.01 mol/L into a cetyltrimethylammonium bromide solution with a molar concentration of 0.1 mol/L, further adding an ice sodium borohydride solution with a molar concentration of 0.01 mol/L, followed by quickly stirring for 2 to 4 min, thereby obtaining the gold seed solution, wherein molar concentrations of tetrachloroauric acid, cetyltrimethylammonium bromide and sodium borohydride in the gold seed solution are 0.3 to 0.5 mmol/L, 0.07 to 0.09 mol/L and 0.7 to 0.9 mmol/L, respectively; (2) preparing a gold nanorod solution by a seed solution growth process, including: mixing the cetyltrimethylammonium bromide solution with a molar concentration of 0.1 mol/L, the tetrachloroauric acid solution with a molar concentration of 0.01 mol/L and a silver nitrate solution with a molar concentration of 0.01 mol/L under stirring, and further adding an ascorbic acid solution with a molar concentration of 0.1 mol/L, thereby obtaining a mixed solution, wherein molar concentrations of cetyltrimethylammonium bromide, tetrachloroauric acid, silver nitrate and ascorbic acid in the mixed solution are 0.07 to 0.09 mol/L, 0.4 to 0.6 mmol/L, 0.06 to 0.07 mmol/L, and 0.6 to 0.9 mmol/L, respectively, and adding the gold seed solution of step (1) in the mixed solution, followed by standing for 3 h, thereby obtaining a gold nanorod solution, wherein in the gold nanorod solution, a volume ratio of the gold seed solution to the mixed solution is 1:(143 to 250); (3) subjecting the gold nanorod solution of step (2) to a centrifugal separation at a rotating speed of 5000 to 8000 rpm/min for 10 to 15 min to obtain the gold nanorods, and dropping the gold nanorods on a silicon substrate; (4) building a system for preparing the gold nanorods having the high catalytic activity by using the femtosecond laser, including the femtosecond laser, an attenuator plate, a half-wave plate, a first mirror, a second mirror, an electronically controlled shutter, a dichroic mirror, a frequency doubling crystal, a stage, a beam splitter, a lamp and a camera, wherein the femtosecond laser, the attenuator plate, the half-wave plate and the first mirror are arranged at one optical axis, a femtosecond laser pulse generated by the femtosecond laser passes through the attenuator plate to adjust energy thereof and further passes through the half-wave plate to adjust a polarization direction of the laser pulse, a propagation direction of the laser pulse is changed by the first and second mirrors, and the propagation direction of the laser pulse is further changed by the dichroic mirror after the laser pulse passes through the electronically controlled shutter, at one side of the dichroic mirror, the frequency doubling crystal and the stage are provided, a wavelength of the laser pulse is changed by the frequency doubling crystal, and the pulse reaches the stage, on which the silicon substrate provided with the gold nanorods is placed, and at the other side of the dichroic mirror, an observation system including the beam splitter, the lamp and the camera is provided, the lamp emits light that passes through the beam splitter, reaches the silicon substrate and is reflected back to the camera to observe preparation of the gold nanorods having the high catalytic activity; and (5) emitting a pulse of the femtosecond laser with a femtosecond laser fluence of 0.2 to 2.1 mJ/cm$^2$, a femtosecond laser irradiation time of 5 to 15 min, and a femtosecond laser wavelength of 400 to 800 nm on the silicon substrate of step (3), to allow an electric field distribution of a surface of the gold nanorod on the silicon substrate to change, to partially exfoliate atoms on the surface of the gold nanorod, thereby obtaining the gold nanorods with the high catalytic activity.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
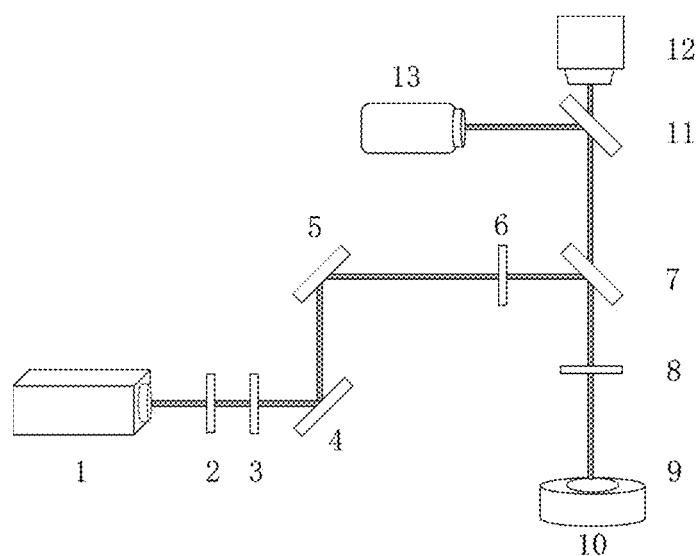
FIG. 1 is a schematic diagram of a system for preparing gold nanorods having a high catalytic activity by using a femtosecond laser according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure.

The present disclosure provides in embodiments a method for preparing gold nanorods having a high catalytic activity by using a femtosecond laser. The method includes the following steps.

In step (1), a gold seed solution is prepared.

A tetrachloroauric acid ($HAuCl_4$) solution with a molar concentration of 0.01 mol/L is added into a cetyltrimethylammonium bromide (CTAB) solution with a molar concentration of 0.1 mol/L, and further added with an ice sodium borohydride ($NaBH_4$) solution with a molar concentration of 0.01 mol/L. After quickly stirring for 2 to 4 min, a gold seed solution is obtained. In the gold seed solution, the molar concentrations of tetrachloroauric acid, cetyltrimethylammonium bromide and sodium borohydride are 0.3 to 0.5 mmol/L, 0.07 to 0.09 mol/L and 0.7 to 0.9 mmol/L, respectively.

In step (2), a gold nanorod solution is prepared by a seed solution growth process.

The cetyltrimethylammonium bromide (CTAB) solution with a molar concentration of 0.1 mol/L, the tetrachloroauric acid ($HAuCl_4$) solution with a molar concentration of 0.01 mol/L and a silver nitrate ($AgNO_3$) solution with a molar concentration of 0.01 mol/L are mixed and stirred, and further added with an ascorbic acid ($C_6H_8O_6$) solution with a molar concentration of 0.1 mol/L, thereby obtaining a mixed solution. In the mixed solution, molar concentrations of cetyltrimethylammonium bromide, tetrachloroauric acid, silver nitrate and ascorbic acid are 0.07 to 0.09 mol/L, 0.4 to 0.6 mmol/L, 0.06 to 0.07 mmol/L, and 0.6 to 0.9 mmol/L, respectively. The gold seed solution of step (1) is added in the mixed solution. After standing for 3 h, a gold nanorod solution is obtained. In the gold nanorod solution, a volume ratio of the gold seed solution to the mixed solution is 1:(143 to 250).

In step (3), the gold nanorod solution of step (2) is centrifuged at a rotating speed of 5000 to 8000 rpm/min for 10 to 15 min. After centrifugal separation, gold nanorods are obtained, and further dropped on a silicon substrate.

In step (4), a pulse of a femtosecond laser is emitted on the silicon substrate of step (3). The femtosecond laser has a fluence of 0.2 to 2.1 $mJ/cm^2$, and a femtosecond laser irradiation time of 5 to 15 min. A wavelength of the femtosecond laser is adjusted to change an electric field distribution of a surface of the gold nanorod on the substrate to realize partial exfoliation of atoms on the surface of the gold nanorod, thereby obtaining the gold nanorods with the high catalytic activity.

In step (4) of the above method for preparing the gold nanorods with the high catalytic activity by using the femtosecond laser, the laser wavelength may be in a range of 400 to 800 nm.

The present disclosure provides in embodiments a system for preparing gold nanorods having a high catalytic activity by using a femtosecond laser. The system includes the femtosecond laser, an attenuator plate, a half-wave plate, a first mirror, a second mirror, an electronically controlled shutter, a dichroic mirror, a frequency doubling crystal, a stage, a beam splitter, a lamp and a camera.

The femtosecond laser, the attenuator plate, the half-wave plate and the first mirror are arranged at one optical axis. A femtosecond laser pulse generated by the femtosecond laser passes through the attenuator plate to adjust energy and further passes through the half-wave plate to adjust polarization direction. A propagation direction of the laser pulse is changed by the first and second mirrors. Moreover, the propagation direction of the laser pulse is further changed by the dichroic mirror after the pulse passes through the electronically controlled shutter. At one side of the dichroic mirror, the frequency doubling crystal and the stage are provided. A wavelength of the laser pulse is changed by the frequency doubling crystal, and the pulse finally reaches the stage. On the stage, a silicon substrate provided with the gold nanorods is placed. At the other side of the dichroic mirror, an observation system including the beam splitter, the lamp and the camera is provided. The lamp emits light that passes through the beam splitter, reaches the silicon substrate and is reflected back to the camera to observe the preparation of the gold nanorods having the high catalytic activity.

The method and the system for preparing gold nanorods having a high catalytic activity by using a femtosecond laser of the present disclosure have the following advantages.

Existing chemical methods, for example, a chemical etching method, have complex reaction conditions, and thus the reaction process thereof are difficult to be controlled. With the method for preparing the gold nanorod having the high catalytic activity by using the femtosecond laser of the present disclosure, the gold nanorods are shaped by the femtosecond laser pulse with designed laser polarization and wavelength to realize the high catalytic activity of the gold nanorods. Moreover, the preparation process is less complex compared with the existing methods in the art.

With the system for preparing gold nanorods having a high catalytic activity by using a femtosecond laser of the present disclosure, the polarization direction and wavelength of the femtosecond laser can be adjusted and well-controlled. Moreover, operations for the system are less complex.

The present disclosure is further described in detail with reference to drawings and examples as follows.

EXAMPLE 1

In step (1), a gold seed solution was prepared.

A tetrachloroauric acid ($HAuCl_4$) solution with a molar concentration of 0.01 mol/L was added into a cetyltrimethylammonium bromide (CTAB) solution with a molar concentration of 0.1 mol/L, and further added with an ice sodium borohydride ($NaBH_4$) solution with a molar concentration of 0.01 mol/L. After quickly stirring for 2 to 4 min, a gold seed solution was obtained. In the gold seed solution, the molar concentrations of tetrachloroauric acid, cetyltrimethylammonium bromide and sodium borohydride were 0.3 mmol/L, 0.09 mol/L and 0.7 mmol/L, respectively.

In step (2), a gold nanorod solution was prepared by a seed solution growth process.

The cetyltrimethylammonium bromide (CTAB) solution with a molar concentration of 0.1 mol/L, the tetrachloroauric acid ($HAuCl_4$) solution with a molar concentration of 0.01 mol/L and a silver nitrate ($AgNO_3$) solution with a molar concentration of 0.01 mol/L were mixed and stirred, and further added with an ascorbic acid ($C_6H_8O_6$) solution with a molar concentration of 0.1 mol/L, thereby obtaining a mixed solution. In the mixed solution, molar concentrations of cetyltrimethylammonium bromide, tetrachloroauric acid, silver nitrate and ascorbic acid are 0.09 mol/L, 0.4 mmol/L, 0.06 mmol/L, and 0.6 mmol/L, respectively. The gold seed solution of step (1) was added in the mixed solution. After standing for 3 h, a gold nanorod solution was obtained. In the gold nanorod solution, a volume ratio of the gold seed solution to the mixed solution was 1:250.

In step (3), 1 mL gold nanorod solution of step (2) was centrifuged at a rotating speed of 8000 rpm/min for 10 min. Concentrated gold nanorod solution obtained was dropped on a silicon substrate and further dried.

In step (4), a pulse of a femtosecond laser was emitted on the silicon substrate of step (3). The femtosecond laser had a fluence of 2 mJ/cm$^2$, and a femtosecond laser irradiation time of 8 min. A wavelength of the femtosecond laser was 800 nm, thereby realizing a selective ablation for the gold nanorods.

Figure 2:
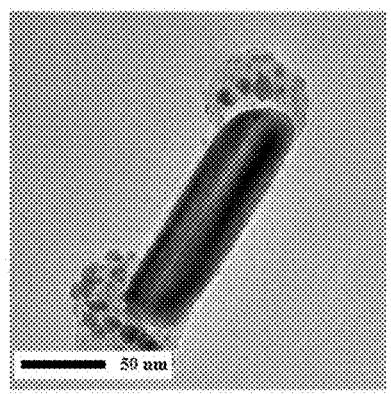
FIG. 2 is a transmission electron micrograph (TEM) image of a gold nanorod irradiated by a laser with a wavelength of 800 nm in Example 1 of the present disclosure.

FIG. 2 shows a TEM image of the gold nanorod prepared in Example 1, which has a high catalytic activity.

Catalytic Activity Test

Catalytic activities of gold nanorods before femtosecond laser irradiation (i.e., the concentrated gold nanorod solution obtained from the above step (3) was dried to obtain gold nanorods without irradiation) and after femtosecond laser irradiation (i.e., the gold nanorods obtained from above step (4)) were compared in a model reaction of the reduction of 4-nitrophenol (4-NP) to 4-aminophenol (4-AP).

In this process, 1 mL of 0.1 mM 4-NP solution and 1.5 mL of 1 mM fresh NaBH$_4$ solution were mixed into a quartz cuvette, following which 20 µg of as-prepared nanorods were added. The optical absorption spectra of the solution were measured using a UV-vis spectrometer between 250 and 500 nm in real time. Reaction rate constant of the irradiated nanorods was recorded as $46 \times 10^{-2}$ min$^{-1}$, and reaction rate constant of the non-irradiated nanorods was recorded as $15 \times 10^{-2}$ min$^{-1}$. That is, after the femtosecond laser irradiation, the Au nanorods exhibited an improved reaction rate which was approximately 3 times the rate of the nanorods without the irradiation. Laser-irradiated Au nanorods exhibited a high catalytic activity and maintained 86% of such a high activity after 7 cycles.

EXAMPLE 2

In step (1), a gold seed solution was prepared.

A tetrachloroauric acid (HAuCl$_4$) solution with a molar concentration of 0.01 mol/L was added into a cetyltrimethylammonium bromide (CTAB) solution with a molar concentration of 0.1 mol/L, and further added with an ice sodium borohydride (NaBH$_4$) solution with a molar concentration of 0.01 mol/L. After quickly stirring for 2 to 4 min, a gold seed solution was obtained. In the gold seed solution, the molar concentrations of tetrachloroauric acid, cetyltrimethylammonium bromide and sodium borohydride were 0.3 mmol/L, 0.09 mol/L and 0.7 mmol/L, respectively.

In step (2), a gold nanorod solution was prepared by a seed solution growth process.

The cetyltrimethylammonium bromide (CTAB) solution with a molar concentration of 0.1 mol/L, the tetrachloroauric acid (HAuCl$_4$) solution with a molar concentration of 0.01 mol/L and a silver nitrate (AgNO$_3$) solution with a molar concentration of 0.01 mol/L were mixed and stirred, and further added with an ascorbic acid (C$_6$H$_8$O$_6$) solution with a molar concentration of 0.1 mol/L, thereby obtaining a mixed solution. In the mixed solution, molar concentrations of cetyltrimethylammonium bromide, tetrachloroauric acid, silver nitrate and ascorbic acid are 0.09 mol/L, 0.4 mmol/L, 0.06 mmol/L, and 0.6 mmol/L, respectively. The gold seed solution of step (1) was added in the mixed solution. After standing for 3 h, a gold nanorod solution was obtained. In the gold nanorod solution, a volume ratio of the gold seed solution to the mixed solution was 1:250.

In step (3), 1 mL gold nanorod solution of step (2) was centrifuged at a rotating speed of 8000 rpm/min for 10 min. Concentrated gold nanorod solution obtained was dropped on a silicon substrate and further dried.

In step (4), a pulse of a femtosecond laser was emitted on the silicon substrate of step (3). The femtosecond laser had a fluence of 2 mJ/cm$^2$, and a femtosecond laser irradiation time of 8 min. A wavelength of the femtosecond laser was 400 nm, thereby realizing a selective ablation for the gold nanorods.

Figure 3:
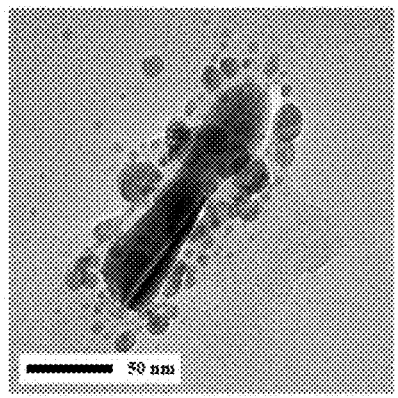
FIG. 3 is a TEM image of a gold nanorod irradiated with a laser with a wavelength of 400 nm in Example 2 of the present disclosure.

FIG. 3 shows a TEM image of the gold nanorod prepared in Example 2, which has a high catalytic activity. The fluences of Examples 1 and 2 are the same, but the wavelengths are different. It can be seem from the comparison between FIG. 3 and FIG. 2 that a change of the wavelength may adjust an electric field distribution on a surface of the gold nanorod, thereby changing crystal pane structure of the gold nanorod processed by the femtosecond laser.

EXAMPLE 3

In step (1), a gold seed solution was prepared.

A tetrachloroauric acid (HAuCl$_4$) solution with a molar concentration of 0.01 mol/L was added into a cetyltrimethylammonium bromide (CTAB) solution with a molar concentration of 0.1 mol/L, and further added with an ice sodium borohydride (NaBH$_4$) solution with a molar concentration of 0.01 mol/L. After quickly stirring for 2 to 4 min, a gold seed solution was obtained. In the gold seed solution, the molar concentrations of tetrachloroauric acid, cetyltrimethylammonium bromide and sodium borohydride were 0.4 mmol/L, 0.08 mol/L and 0.8 mmol/L, respectively.

In step (2), a gold nanorod solution was prepared by a seed solution growth process.

The cetyltrimethylammonium bromide (CTAB) solution with a molar concentration of 0.1 mol/L, the tetrachloroauric acid (HAuCl$_4$) solution with a molar concentration of 0.01 mol/L and a silver nitrate (AgNO$_3$) solution with a molar concentration of 0.01 mol/L were mixed and stirred, and further added with an ascorbic acid (C$_6$H$_8$O$_6$) solution with a molar concentration of 0.1 mol/L, thereby obtaining a mixed solution. In the mixed solution, molar concentrations of cetyltrimethylammonium bromide, tetrachloroauric acid, silver nitrate and ascorbic acid are 0.07 mol/L, 0.4 mmol/L, 0.06 mmol/L, and 0.65 mmol/L, respectively. The gold seed solution of step (1) was added in the mixed solution. After standing for 3 h, a gold nanorod solution was obtained. In the gold nanorod solution, a volume ratio of the gold seed solution to the mixed solution was 1:200.

In step (3), 1 mL gold nanorod solution of step (2) was centrifuged at a rotating speed of 8000 rpm/min for 10 min. Concentrated gold nanorod solution obtained was dropped on a silicon substrate and further dried.

In step (4), a pulse of a femtosecond laser was emitted on the silicon substrate of step (3). The femtosecond laser had a fluence of 1.5 mJ/cm$^2$, and a femtosecond laser irradiation time of 10 min. A wavelength of the femtosecond laser was 800 nm, thereby realizing a selective ablation for the gold nanorods.

EXAMPLE 4

In step (1), a gold seed solution was prepared.

A tetrachloroauric acid (HAuCl$_4$) solution with a molar concentration of 0.01 mol/L was added into a cetyltrimethylammonium bromide (CTAB) solution with a molar concentration of 0.1 mol/L, and further added with an ice sodium borohydride (NaBH$_4$) solution with a molar concentration of 0.01 mol/L. After quickly stirring for 2 to 4 min, a gold seed solution was obtained. In the gold seed solution, the molar concentrations of tetrachloroauric acid, cetyltrimethylammonium bromide and sodium borohydride were 0.5 mmol/L, 0.09 mol/L and 0.9 mmol/L, respectively.

In step (2), a gold nanorod solution was prepared by a seed solution growth process.

The cetyltrimethylammonium bromide (CTAB) solution with a molar concentration of 0.1 mol/L, the tetrachloroauric acid (HAuCl$_4$) solution with a molar concentration of 0.01 mol/L and a silver nitrate (AgNO$_3$) solution with a molar concentration of 0.01 mol/L were mixed and stirred, and further added with an ascorbic acid (C$_6$H$_8$O$_6$) solution with a molar concentration of 0.1 mol/L, thereby obtaining a mixed solution. In the mixed solution, molar concentrations of cetyltrimethylammonium bromide, tetrachloroauric acid, silver nitrate and ascorbic acid are 0.08 mol/L, 0.5 mmol/L, 0.07 mmol/L, and 0.9 mmol/L, respectively. The gold seed solution of step (1) was added in the mixed solution. After standing for 3 h, a gold nanorod solution was obtained. In the gold nanorod solution, a volume ratio of the gold seed solution to the mixed solution was 1:180. In step (3), 1 mL gold nanorod solution of step (2) was centrifuged at a rotating speed of 8000 rpm/min for 10 min. Concentrated gold nanorod solution obtained was dropped on a silicon substrate and further dried.

In step (4), a pulse of a femtosecond laser was emitted on the silicon substrate of step (3). The femtosecond laser had a fluence of 1.5 mJ/cm$^2$, and a femtosecond laser irradiation time of 15 min. A wavelength of the femtosecond laser was 400 nm, thereby realizing a selective ablation for the gold nanorods.

In addition, the present disclosure provides a system for preparing gold nanorods having a high catalytic activity by using a femtosecond laser, as shown in FIG. 1. The system includes the femtosecond laser 1, an attenuator plate 2, a half-wave plate 3, a first mirror 4, a second mirror 5, an electronically controlled shutter 6, a dichroic mirror 7, a frequency doubling crystal 8, a stage 10, a beam splitter 11, a lamp 12 and a camera 13.

The femtosecond laser 1, the attenuator plate 2, the half-wave plate 3 and the first mirror 4 are arranged at one optical axis. The laser pulse passes the second mirror 5 and the dichroic mirror 7. The electronically controlled shutter 6 is positioned between the second mirror 5 and the dichroic mirror 7. At one side of the dichroic mirror 7, a (β-barium metaborate (β-BaB$_2$O$_4$, BBO) crystal 8, a silicon substrate 9 and the stage 10 are provided. At the other side of the dichroic mirror 7, an observation system including the beam splitter 11, the lamp 12 and the camera 13 is provided. A femtosecond laser pulse generated by the femtosecond laser 1 passes through the attenuator plate 2 to adjust energy and further passes through the half-wave plate 3 to adjust polarization direction. A propagation direction of the laser pulse is changed by the first mirror 4 and the second mirror 5. Moreover, the propagation direction of the laser pulse is further changed by the dichroic mirror 7 after the pulse passes through the electronically controlled shutter 6. A wavelength of the laser pulse is changed by the BBO crystal 8, and the pulse finally reaches the silicon substrate 9 provided with the gold nanorods. With the observation system, the preparation process of the gold nanorods exhibiting the high catalytic activity can be observed.

In an embodiment of the present system for preparing gold nanorods having a high catalytic activity, the femtosecond laser used is a titanium-doped sapphire laser Astrella from Coherent, with a center wavelength of 800 nm, a pulse width of 35 fs, a repetition frequency of up to 1000 Hz, a maximum single pulse energy of 7 mJ, and a light intensity distribution of Gaussian.

For example, the femtosecond laser 1 used in Examples has the laser center wavelength of 800 nm, the repetition frequency of 1 KHz and the pulse width of 35 fs.

The process for operating the system for preparing gold nanorods having a high catalytic activity by using a femtosecond laser of the present disclosure is described as follows.

The femtosecond laser 1 is turned on to generate a laser pulse, and the attenuator plate 2 is used to adjust the energy of the laser pulse to meet a power requirement for ablating the gold nanorods, which is between 0.2 and 2.1 mJ/cm$^2$. After the half-wave plate 3, a vertically polarized laser beam is obtained. The BBO crystal 8 can be used to change the wavelength of the laser, for example to be 800 nm or 400 nm. The silicon substrate 9 is placed on the stage 10, and the femtosecond laser is introduced onto the silicon substrate 9. A position of the laser beam relative to the stage 10 is adjusted so that the laser passes through the center of the silicon substrate 9. By adjusting the opening time of the electronically controlled shutter 6, the irradiation time of the pulse emitted onto the gold nanorods can be controlled. Therefore, the preparation of the gold nanorods with the high catalytic activity is realized.

In an embodiment of the operation process, the laser fluence is adjusted as 2 mJ/cm$^2$ by adjusting the attenuator plate 2. The BBO crystal 8 is adjusted to obtain the wavelength of 800 nm. The irradiation time of the pulse emitted on the gold nanorods is controlled to be 8 min by the electronically controlled shutter 7. The gold nanorods as shown in FIG. 2 is thus prepared.

In another embodiment of the operation process, the laser fluence is adjusted as 2 mJ/cm$^2$ by adjusting the attenuator plate 2. The BBO crystal 8 is adjusted to obtain the wavelength of 400 nm. The irradiation time of the pulse emitted on the gold nanorods is controlled to be 8 min by the electronically controlled shutter 7. The gold nanorods as shown in FIG. 3 is thus prepared.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for preparing gold nanorods having a high catalytic activity by using a femtosecond laser, comprising:

(1) preparing a gold seed solution, comprising:
adding a tetrachloroauric acid solution with a molar concentration of 0.01 mol/L into a cetyltrimethylammonium bromide solution with a molar concentration of 0.1 mol/L, further adding an ice sodium borohydride solution with a molar concentration of 0.01 mol/L, followed by quickly stirring for 2 to 4 min, thereby obtaining the gold seed solution, wherein molar concentrations of tetrachloroauric acid, cetyltrimethylammonium bromide and sodium borohydride in the gold seed solution are 0.3 to 0.5 mmol/L, 0.07 to 0.09 mol/L and 0.7 to 0.9 mmol/L, respectively;

(2) preparing a gold nanorod solution by a seed solution growth process, comprising:
mixing the cetyltrimethylammonium bromide solution with a molar concentration of 0.1 mol/L, the tetrachloroauric acid solution with a molar concentration of 0.01 mol/L and a silver nitrate solution with a molar concentration of 0.01 mol/L under stirring, and further adding an ascorbic acid solution with a molar concentration of 0.1 mol/L, thereby obtaining a mixed solution, wherein molar concentrations of cetyltrimethylammonium bromide, tetrachloroauric acid, silver nitrate and ascorbic acid in the mixed solution are 0.07 to 0.09 mol/L, 0.4 to 0.6 mmol/L, 0.06 to 0.07 mmol/L, and 0.6 to 0.9 mmol/L, respectively, and
adding the gold seed solution of step (1) in the mixed solution, followed by standing for 3 h, thereby obtaining a gold nanorod solution, wherein in the gold nanorod solution, a volume ratio of the gold seed solution to the mixed solution is 1:(143 to 250);

(3) subjecting the gold nanorod solution of step (2) to a centrifugal separation at a rotating speed of 5000 to 8000 rpm/min for 10 to 15 min to obtain the gold nanorods, and dropping the gold nanorods on a silicon substrate;

(4) building a system for preparing the gold nanorods having the high catalytic activity by using the femtosecond laser, comprising the femtosecond laser, an attenuator plate, a half-wave plate, a first mirror, a second mirror, an electronically controlled shutter, a dichroic mirror, a frequency doubling crystal, a stage, a beam splitter, a lamp and a camera, wherein
the femtosecond laser, the attenuator plate, the half-wave plate and the first mirror are arranged at one optical axis,
a femtosecond laser pulse generated by the femtosecond laser passes through the attenuator plate to adjust energy thereof and further passes through the half-wave plate to adjust a polarization direction of the laser pulse,
a propagation direction of the laser pulse is changed by the first and second mirrors, and the propagation direction of the laser pulse is further changed by the dichroic mirror after the laser pulse passes through the electronically controlled shutter,
at one side of the dichroic mirror, the frequency doubling crystal and the stage are provided, a wavelength of the laser pulse is changed by the frequency doubling crystal, and the pulse reaches the stage, on which the silicon substrate provided with the gold nanorods is placed, and
at the other side of the dichroic mirror, an observation system including the beam splitter, the lamp and the camera is provided, the lamp emits light that passes through the beam splitter, reaches the silicon substrate and is reflected back to the camera to observe preparation of the gold nanorods having the high catalytic activity;
and (5) emitting a pulse of the femtosecond laser with a femtosecond laser fluence of 0.2 to 2.1 mJ/cm$^2$, a femtosecond laser irradiation time of 5 to 15 min, and a femtosecond laser wavelength of 400 to 800 nm on the silicon substrate of step (3), to allow an electric field distribution of a surface of the gold nanorod on the silicon substrate to change, to partially exfoliate atoms on the surface of the gold nanorod, thereby obtaining the gold nanorods with the high catalytic activity.

2. The method according to claim 1, wherein the molar concentrations of tetrachloroauric acid, cetyltrimethylammonium bromide and sodium borohydride in the gold seed solution are 0.3 mmol/L, 0.09 mol/L and 0.7 mmol/L, respectively.

3. The method according to claim 1, wherein the molar concentrations of tetrachloroauric acid, cetyltrimethylammonium bromide and sodium borohydride in the gold seed solution are 0.4 mmol/L, 0.08 mol/L and 0.8 mmol/L, respectively.

4. The method according to claim 1, wherein the molar concentrations of tetrachloroauric acid, cetyltrimethylammonium bromide and sodium borohydride in the gold seed solution are 0.5 mmol/L, 0.09 mol/L and 0.9 mmol/L, respectively.

5. The method according to claim 1, wherein the molar concentrations of cetyltrimethylammonium bromide, tetrachloroauric acid, silver nitrate and ascorbic acid in the mixed solution are 0.09 mol/L, 0.4 mmol/L, 0.06 mmol/L and 0.6 mmol/L, respectively.

6. The method according to claim 1, wherein the molar concentrations of cetyltrimethylammonium bromide, tetrachloroauric acid, silver nitrate and ascorbic acid in the mixed solution are 0.07 mol/L, 0.4 mmol/L, 0.06 mmol/L and 0.65 mmol/L, respectively.

7. The method according to claim 1, wherein the molar concentrations of cetyltrimethylammonium bromide, tetrachloroauric acid, silver nitrate and ascorbic acid in the mixed solution are 0.08 mol/L, 0.5 mmol/L, 0.07 mmol/L and 0.9 mmol/L, respectively.

8. The method according to claim 1, wherein the volume ratio of the gold seed solution to the mixed solution is 1:250.

9. The method according to claim 1, wherein the volume ratio of the gold seed solution to the mixed solution is 1:200.

10. The method according to claim 1, wherein the volume ratio of the gold seed solution to the mixed solution is 1:180.

11. The method according to claim 1, wherein the centrifugal separation is performed at a rotating speed of 8000 rpm/min for 10 min.

12. The method according to claim 1, wherein the femtosecond laser has the femtosecond laser fluence of 2 mJ/cm$^2$ and the femtosecond laser irradiation time of 8 min.

13. The method according to claim 1, wherein the femtosecond laser has the femtosecond laser fluence of 1.5 mJ/cm$^2$ and the femtosecond laser irradiation time of 10 min.

14. The method according to claim 1, wherein the femtosecond laser has the femtosecond laser fluence of 1.5 mJ/cm$^2$ and the femtosecond laser irradiation time of 15 min.

15. The method according to claim 1, wherein the femtosecond laser has the femtosecond laser wavelength of 400 or 800 nm.

* * * * *